United States Patent [19]
Taylor

[11] Patent Number: 5,730,179
[45] Date of Patent: Mar. 24, 1998

[54] RAINWATER COLLECTION AND DISTRIBUTION APPARATUS

[76] Inventor: Jonathan Dwayne Taylor, 501 Fox Hill Rd., Hampton, Va. 23669

[21] Appl. No.: 606,209

[22] Filed: Feb. 23, 1996

[51] Int. Cl.⁶ .............................. F16L 5/00; E04D 13/08
[52] U.S. Cl. .................. 137/357; 137/376; 137/587; 52/16
[58] Field of Search .................. 52/16; 137/357, 137/373, 376, 343, 587

[56] References Cited

U.S. PATENT DOCUMENTS

| | | | |
|---|---|---|---|
| D. 312,069 | 11/1990 | Williamson et al. | D13/102 |
| D. 353,436 | 12/1994 | Hess | 137/592 |
| 1,597,283 | 8/1926 | Murray | 52/16 |
| 3,990,600 | 11/1976 | Rossitto et al. | 220/69 |
| 4,161,186 | 7/1979 | Sitarz | 137/357 |
| 4,726,151 | 2/1988 | Vitale | 52/16 |
| 4,815,621 | 3/1989 | Bartis | 220/202 |
| 5,046,529 | 9/1991 | Corella | 137/587 |
| 5,282,546 | 2/1994 | Bauer | 220/565 |
| 5,407,091 | 4/1995 | Wallis | 220/565 |
| 5,533,303 | 7/1996 | Harvey | 137/357 |
| 5,535,554 | 7/1996 | Harris, Jr. | 52/16 |

FOREIGN PATENT DOCUMENTS 23107  1/1883  Germany.

*Primary Examiner*—A. Michael Chambers

[57] ABSTRACT

A rainwater collection and distribution apparatus includes a tank which includes a water entry portion, a water exit portion, and a water containment portion located between the water entry portion and the water exit portion. A valve assembly is connected to the water exit portion of the tank. A flexible adaptor conduit is connected at one end to the water entry portion of the tank and is connectable at another end to a portion of a gutter down spout. A plurality of stakes are connected to a bottom portion of the water containment portion of the tank for fixing the tank to a portion of a ground surface. The water containment portion of the tank has a tank diameter and a hydrostatic-pressure-development height extending from a distal end portion of the water containment portion to the valve assembly. A ratio of the hydrostatic-pressure-development height to the tank diameter is equal to or greater than three. The tank includes an overflow aperture located at a distal end portion of the water containment portion. A screen assembly may be located in-line between the flexible conduit and the water entry portion of the tank. A hose is connectable by threads to a complimentarily threaded end of the valve assembly. An aperture-containing water distributor assembly is connected to a second end of the hose. The aperture-containing water distributor assembly may be comprised of an apertured hollow cylindrical housing or an apertured hollow pyramidal housing.

3 Claims, 3 Drawing Sheets

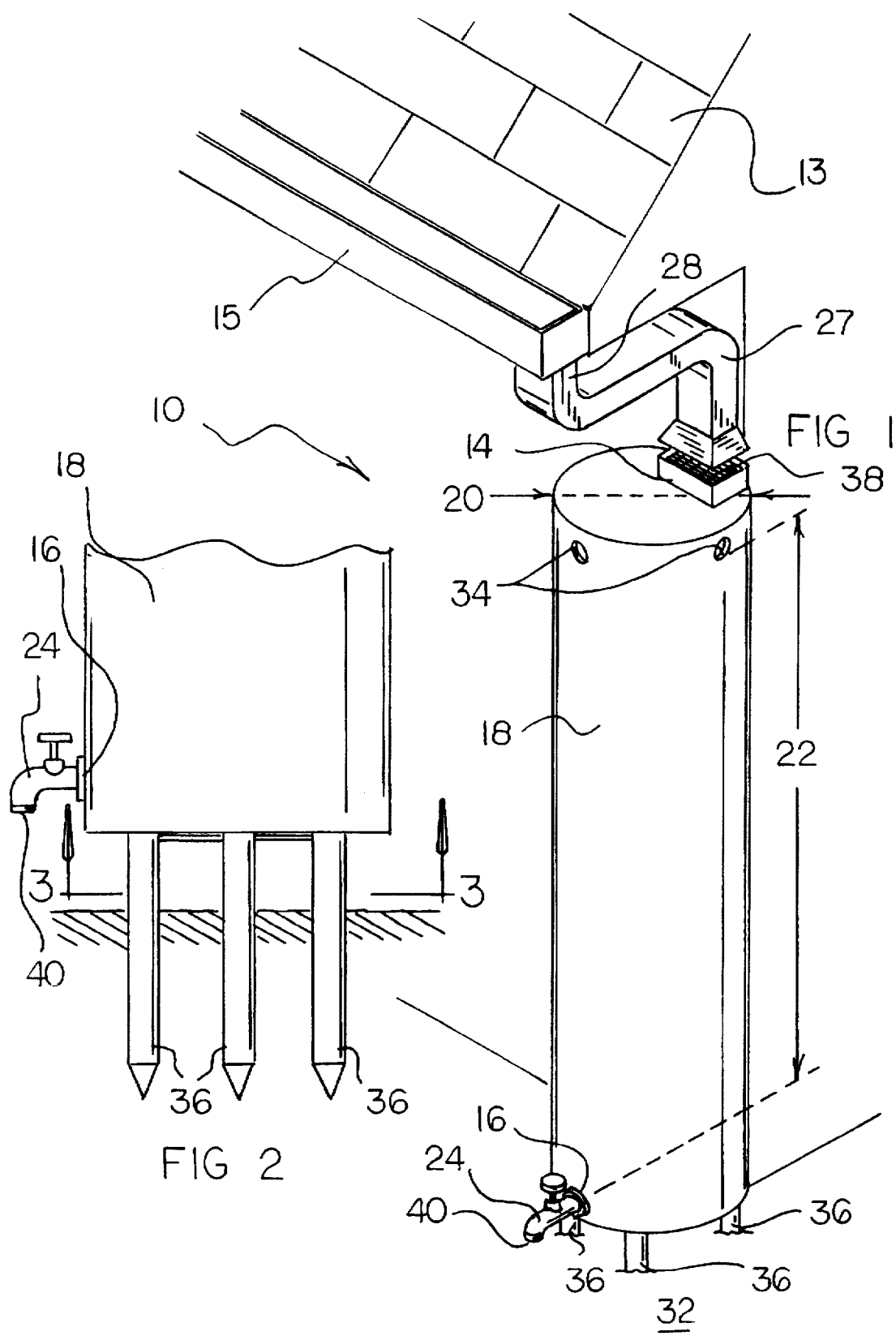

RAINWATER COLLECTION AND DISTRIBUTION APPARATUS

BACKGROUND OF THE INVENTION

1. Field of the Invention

The present invention relates generally to water storage devices and, more particularly, to devices especially adapted for storing rainwater.

2. Description of the Prior Art

Because persons need water for many reasons, in times of low water supply, water conservation may be very important. More specifically, when ground water levels are low and when municipal reservoir water levels are low, water conservation is especially important. One approach to conserving water supplies from conventional sources is to obtain water from alternative sources. Rainwater is one such alternative source of water that has been used for many years. It is well known to place an open barrel or other suitable container under a roof down spout to collect rainwater that runs off of a roof. Although an open barrel may collect water well, contaminants, such as falling leaves, may also enter an open barrel. In this respect, it would be desirable if a rainwater collection device were provided which is part of a relatively closed system to prevent contamination of collected rainwater from fallen leaves.

Naturally falling rain is the most natural form of water for watering gardens and lawns. However, during times of drought, naturally falling rain may not provide enough water for adequate watering. At such times, accumulated rainwater in an open barrel may be used for providing auxiliary watering. However, an open barrel does not have provisions for distributing the accumulated rainwater onto gardens, lawns, and the like. In this respect, it would be desirable if a rainwater collection device were provided with features for distributing collected rainwater onto gardens, lawns, and the like.

Throughout the years, a number of innovations have been developed relating to storing liquids for later use, and the following U.S. patents are representative of some of those innovations: U.S. Pat. Nos. 3,990,600, 4,815,621, 5,282, 546, 5,407,091, Des. 312,069, and Des. 353,436. More specifically, U.S. Pat. No. 3,990,600 discloses an open top storage tank. As discussed above, such an open top permits entry of fallen leaves into collected water.

Each of U.S. Pat. Nos. 4,815,621, 5,282,546, and 5,407, 091 discloses double-walled storage tanks. Providing double-wall construction for tanks may be important for storing certain liquids, particularly temperature sensitive liquids. However, for storing collected rainwater, double-wall tank construction is an unnecessary expense. In this respect, it would be desirable if a rainwater collection device were provided which does not employ double-wall construction.

U.S. Pat. No. Des. 353,436 discloses an emergency water storage tank that is enclosed. However, the emergency storage tank does not provide water distribution features. Moreover, no provision is made for adapting the tank to collection of rainwater from a gutter down spout. In this respect, it would be desirable if a rainwater collection device were provided with a feature for adapting the collection device to a down spout.

U.S. Pat. No. Des. 312,069 may be of interest for its disclosure of combined solar collector and liquid storage tank for solar water heater. No provisions are made for collecting rainwater.

Still other features would be desirable in a rainwater collection and distribution apparatus. For example, open barrels generally rest upon a ground surface, but the barrel itself is not secured to the ground surface. During high winds, a barrel may be blown over. In this respect, it would be desirable if a rainwater collection device were provided with features to secure the collection device to a ground surface.

Because of many variations in building construction, it may be difficult to place a rainwater entry opening in a rainwater collection device directly under a gutter down spout. For this reason, it would be desirable if a flexible adaptor conduit were provided for conveying water from a gutter down spout to a entry opening in a rainwater collection device.

There may be times when so much rainwater is collected that a collection tank becomes full. At this point, it would be desirable if the collection tank had overflow apertures that permit excess water to overflow from the tank.

With typical open barrels used for rainwater collection, the ratio of the barrel height to barrel diameter is relatively low. As a result, even when the barrel is full, a relatively low hydrostatic head is present in water near the bottom of the barrel. Since rainwater that is accumulated in a rainwater collection device may be distributed onto a garden, lawn, or the like, it would be desirable if a relatively large hydrostatic head would be present in water near the bottom of the collection device to facilitate distribution of the water.

Thus, while the foregoing body of prior art indicates it to be well known to use tanks to collect and store liquids such as rainwater, the prior art described above does not teach or suggest a rainwater collection and distribution apparatus which has the following combination of desirable features: (1) is part of a relatively closed system to prevent contamination of collected rainwater from fallen leaves; (2) is provided with features for distributing collected rainwater onto gardens, lawns, and the like; (3) does not employ double-wall construction; (4) is provided with a feature for adapting the collection device to a gutter down spout; (5) is provided with features to secure the collection device to a ground surface; (6) is provided with a flexible adaptor conduit for conveying water from a gutter down spout to an entry opening in a rainwater collection device; (7) has overflow apertures that permit excess water to overflow from the tank; and (8) provides a relatively large hydrostatic head in water near the bottom of the collection device to facilitate distribution of the water. The foregoing desired characteristics are provided by the unique rainwater collection and distribution apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a rainwater collection and distribution apparatus includes a tank assembly which includes a water entry portion, a water exit portion, and a water containment portion located between the water entry portion and the water exit portion. A valve assembly is connected to the water exit portion of the tank assembly. An adaptor conduit is connected at one end to the water entry portion of the tank assembly and is connectable at another end to a portion of a gutter down spout. A ground-fixing assembly is connected to a bottom portion of the water containment portion of the tank assembly for fixing the tank assembly to a portion of a ground surface.

The water containment portion of the tank assembly has a tank diameter and a hydrostatic-pressure-development height extending from a distal end portion of the water containment portion to the valve assembly. A ratio of the hydrostatic-pressure-development height to the tank diameter is equal to or greater than three. The tank assembly includes an overflow aperture located at a distal end portion of the water containment portion.

The adaptor conduit is comprised of a flexible conduit. The ground-fixing assembly includes a plurality of stakes which extend downward from the water containment portion of the tank assembly. A screen assembly may be located in-line between the flexible conduit and the water entry portion of the tank assembly.

A hose is connectable at one end to the valve assembly. The valve assembly includes a threaded spout portion, and the hose includes a threaded connector for connecting a first end of the hose to the threaded spout portion of the valve assembly. An aperture-containing water distributor assembly is connected to a second end of the hose. The aperture-containing water distributor assembly may be comprised of a hollow cylindrical housing which includes a plurality of water-distribution apertures distributed longitudinally along a cylindrical wall.

Alternatively, the aperture-containing water distributor assembly may be comprised of a hollow pyramidal housing which includes a plurality of water-distribution apertures distributed transversely along a bottom wall of the hollow pyramidal housing.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rainwater collection and distribution apparatus which has all of the advantages of the prior art and none of the disadvantages.

It is another object of the present invention to provide a new and improved rainwater collection and distribution apparatus which may be easily and efficiently manufactured and marketed.

It is a further object of the present invention to provide a new and improved rainwater collection and distribution apparatus which is of durable and reliable construction.

An even further object of the present invention is to provide a new and improved rainwater collection and distribution apparatus which is susceptible of a low cost of manufacture with regard to both materials and labor, and which accordingly is then susceptible of low prices of sale to the consuming public, thereby making such rainwater collection and distribution apparatus available to the buying public.

Still yet a further object of the present invention is to provide a new and improved rainwater collection and distribution apparatus which is part of a relatively closed system to prevent contamination of collected rainwater from fallen leaves.

Still another object of the present invention is to provide a new and improved rainwater collection and distribution apparatus that is provided with features for distributing collected rainwater onto gardens, lawns, and the like.

Yet another object of the present invention is to provide a new and improved rainwater collection and distribution apparatus which does not employ double-wall construction.

Even another object of the present invention is to provide a new and improved rainwater collection and distribution apparatus that is provided with a feature for adapting the collection device to a gutter down spout.

Still a further object of the present invention is to provide a new and improved rainwater collection and distribution apparatus which is provided with features to secure the collection device to a ground surface.

Yet another object of the present invention is to provide a new and improved rainwater collection and distribution apparatus that is provided with a flexible adaptor conduit for conveying water from a gutter down spout to an entry opening in a rainwater collection device.

Still another object of the present invention is to provide a new and improved rainwater collection and distribution apparatus which has overflow apertures that permit excess water to overflow from the tank.

Yet another object of the present invention is to provide a new and improved rainwater collection and distribution apparatus thatrovides a relatively large hydrostatic head in water near the bottom of the collection device to facilitate distribution of the water.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the rainwater collection and distribution apparatus of the invention connected to a gutter down spout and secured to a ground surface.

FIG. 2 is a side view of a lower portion of the embodiment of the rainwater collection and distribution apparatus shown in FIG. 1.

DESCRIPTION OF THE PREFERRED EMBODIMENT

Figure 3:
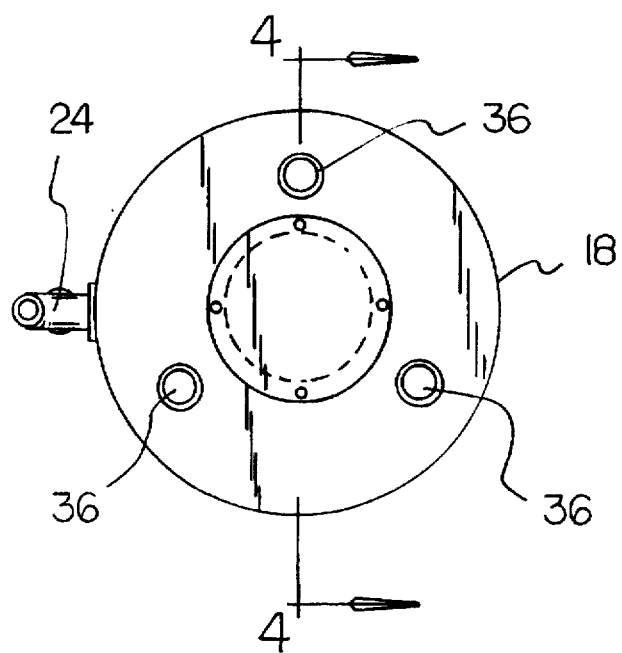
FIG. 3 is a bottom view of the embodiment of the rainwater collection and distribution apparatus of FIG. 2 taken along line 3—3 thereof.

With reference to the drawings, a new and improved rainwater collection and distribution apparatus embodying the principles and concepts of the present invention will be described.

Turning to FIGS. 1–5, there is shown an exemplary embodiment of the rainwater collection and distribution apparatus of the invention generally designated by reference numeral 10. In its preferred form, rainwater collection and distribution apparatus 10 includes a tank assembly which includes a water entry portion 14, a water exit portion 16, and a water containment portion 18 located between the water entry portion 14 and the water exit portion 16. A valve assembly 24 is connected to the water exit portion 16 of the tank assembly. An adaptor conduit is connected at one end to the water entry portion 14 of the tank assembly and is connectable at another end to a portion of a gutter down spout 28. A ground-fixing assembly is connected to a bottom portion of the water containment portion 18 of the tank assembly for fixing the tank assembly to a portion of a ground surface 32.

Figure 4:
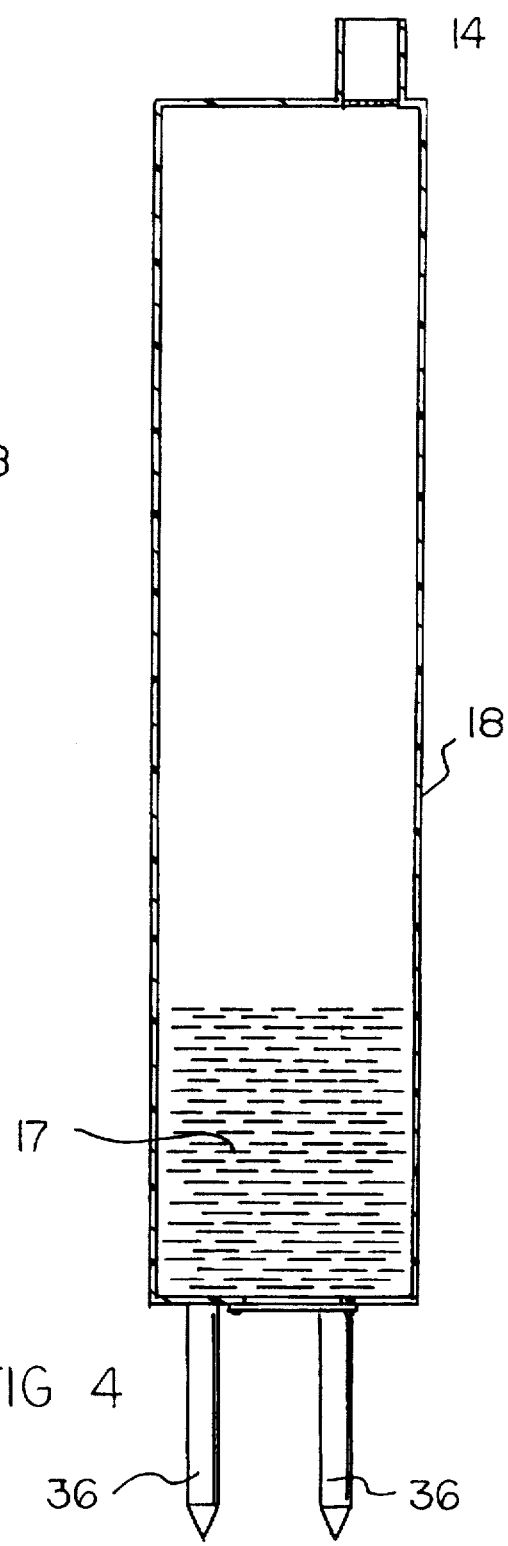
FIG. 4 is a cross-sectional view of the embodiment of the invention shown in FIG. 3 taken along line 4—4 thereof.
Figure 5:
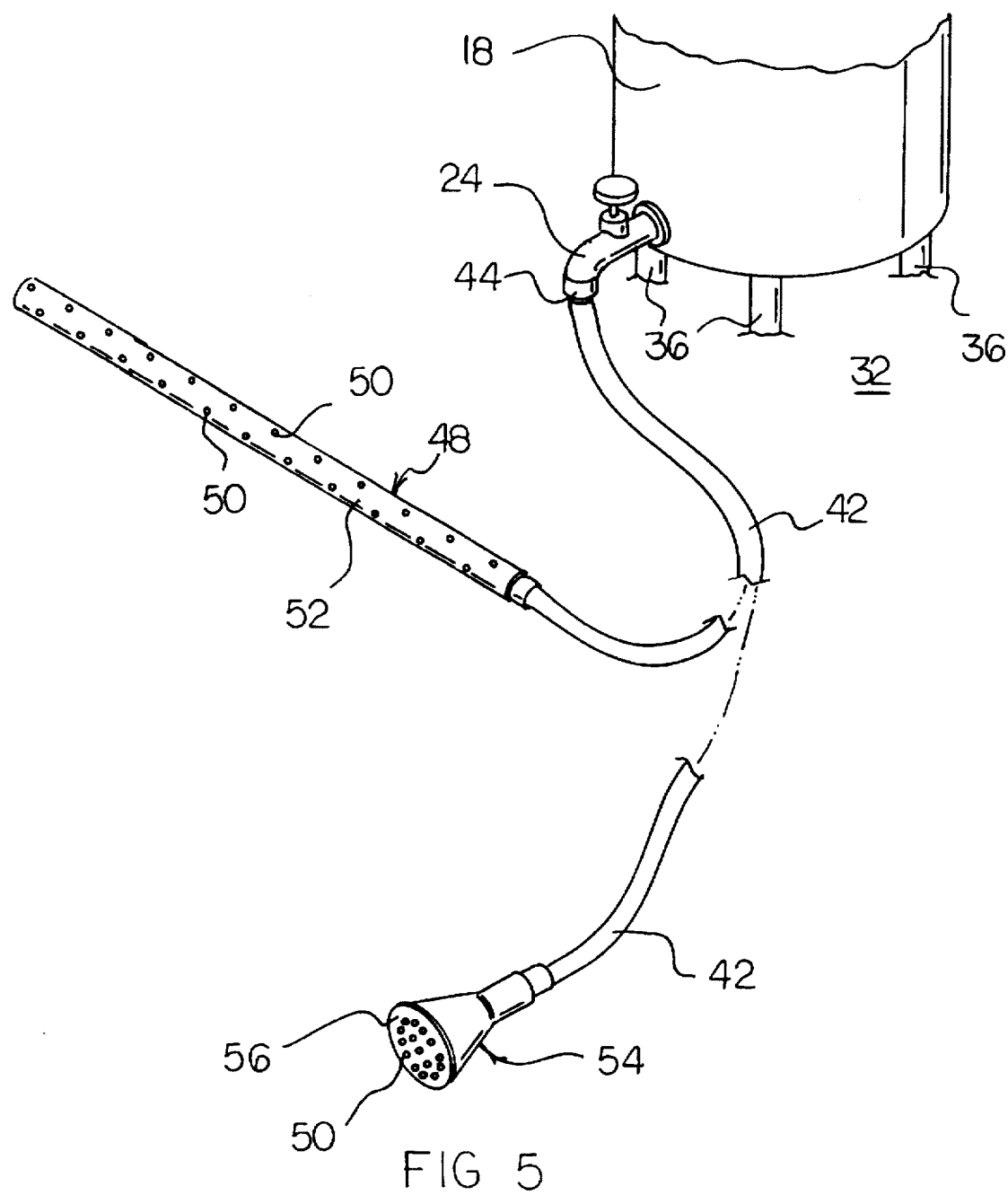
FIG. 5 is a partial perspective view of a lower portion of the embodiment of the invention shown in FIG. 1 connected to a number of alternative water distribution attachments.

The water containment portion 18 of the tank assembly has a tank diameter 20 and a hydrostatic-pressure-development height 22 extending from a distal end portion of the water containment portion 18 to the valve assembly 24. A ratio of the hydrostatic-pressure-development height 22 to the tank diameter 20 is equal to or greater than three. The greater the ratio of the hydrostatic-pressure-development height 22 to the tank diameter 20, the greater the hydrostatic pressure developed by the accumulated water on the valve assembly 24. The greater the pressure exerted on the valve assembly 24, the greater the water pressure for distributing the water. The tank assembly includes an overflow aperture 34 located at a distal end portion of the water containment portion 18. Preferably, and as shown in FIGS. 3 and 4, the bottom panel of water containment portion 18 has a central circular opening normally closed by a flat circular sealing plate and an annular array of conventional, removable fasteners. The flat sealing plate may selectively be removed from time to time in order to gain access to the interior of the water containment portion 18 for the purpose of cleaning the interior thereof, removing accumulated debris passing through the intake filter screen assembly, and so on.

The adaptor conduit is comprised of a flexible conduit 27. The ground-fixing assembly includes a plurality of stakes 36 which extend downward from the water containment portion 18 of the tank assembly. A filter screen assembly 38 may be located in-line between the flexible conduit 27 and the water entry portion 14 of the tank assembly. If desired, a filter screen can be installed in the gutter, at the junction of the down spout with the gutter, to protect the accumulated water from fallen leaves and other debris.

As shown in FIG. 1, the invention 10 is intended to be utilized with a house (not labeled) situated upon a ground surface 32. The house has an overhanging roof eave (not labeled) along which the gutter 15 extends. The tank assembly is removably positionable between the overhanging roof eave and the ground surface 32. Preferably, an outermost surface of the gutter 15 is positioned an overhang distance from the exterior wall. The tank diameter 20 of the water containment portion 18 of the tank assembly is substantially less than the overhang distance such that the entire tank assembly can be positioned completely under cover of the gutter 15 and overhanging eave to protect the tank assembly.

A hose 42 is connectable at one end to the valve assembly 24. The valve assembly 24 includes a threaded spout portion 40, and the hose 42 includes a threaded connector 44 for connecting a first end of the hose 42 to the threaded spout portion 40 of the valve assembly 24. An aperture-containing water distributor assembly is connected to a second end of the hose 42. The aperture-containing water distributor assembly may be comprised of a hollow cylindrical housing 48 which includes a plurality of water-distribution apertures 50 distributed longitudinally along a cylindrical wall 52. This form of the aperture-containing water distributor assembly can be used to distribute water over a relatively large area. The hollow cylindrical housing 48 form of the aperture-containing water distributor assembly can be provided in various lengths, depending upon the area to be watered. Moreover, a plurality hollow cylindrical housings 48 can be placed in series to cover a wide area.

Alternatively, the aperture-containing water distributor assembly may be comprised of a hollow pyramidal housing 54 which includes a plurality of water-distribution apertures 50 distributed transversely along a bottom wall 56 of the hollow pyramidal housing 54. This form of the aperture-containing water distributor assembly can be used to apply water in a localized area, such as in the form of a fine spray for watering delicate flowers and shrubs.

In using the rainwater collection and distribution apparatus 10 of the invention, the stakes 36 are sunk into the ground surface 32 to stabilize the apparatus. The valve assembly 24 is turned to an "off" position. The water entry portion 14 of the tank assembly is connected to the down spout 28 using a flexible conduit 27. A screen assembly 38 is placed in-line between the flexible conduit 27 and the water containment portion 18 of the tank assembly and is supported by the water entry portion 14. When rainy weather occurs, rain falls upon the roof 13 and flows down to the horizontally oriented gutter 15. Water then flows into the down spout 28, through the flexible conduit 27, through the water entry portion 14 and into the water containment portion 18 of the tank assembly. A quantity of water 17 accumulates in the water containment portion 18. If enough water 17 accumulates, the water level can reach an overflow aperture 34. When the water level reaches an overflow aperture 34 the hydrostatic head pressure of the water 17 on the valve assembly 24 is due to the hydrostatic-pressure-development height 22.

During non-rainy times, a hose 42 is connected to the valve assembly 24. More specifically, the threaded connector 44 of the hose 42 is screwed onto the threaded spout portion 40 of the valve assembly 24. If a wide area is to be watered by the accumulated water 17, a hollow cylindrical housing 48 is connected to an end of the hose 42. Alternatively, if a localized area is to be watered, a hollow pyramidal housing 54 is connected to an end of the hose 42. Once the aperture-containing water distributor assembly has been selected, the valve assembly 24 is turned to an "on" position. Then, water 17 flows from the water containment portion 18, through the water exit portion 16, into the hose 42, and out the aperture-containing water distributor assembly. The water can be used to water gardens, lawns, and the like and to clean items such as hands, tools, cars, etc..

Although the tank assembly is shown to be oriented so that the longitudinal axis of the tank assembly is in a vertical orientation, if desired, the tank assembly can be oriented so that the longitudinal axis is in a horizontal orientation. In a horizontal orientation, however, less of a hydrostatic pressure head will be developed by accumulated water.

The components of the rainwater collection and distribution apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved rainwater collection and distribution apparatus that is low in cost, relatively simple in design and operation, and which may advantageously be used to be part of a relatively closed system to prevent contamination of collected rainwater from fallen leaves. With the invention, a rainwater collection and distribution apparatus is provided which is provided with features for distributing collected rainwater onto gardens, lawns, and the like. With the invention, a rainwater collection and distribution apparatus is provided which does not employ double-wall construction. With the invention, a rainwater collection and distribution apparatus is provided which is provided with a feature for adapting the collection device to a gutter down spout. With the invention, a rainwater collection and distribution apparatus is provided which is provided with features to secure the collection device to a ground surface. With the invention, a rainwater collection and distribution apparatus is provided which is provided with a flexible adaptor conduit for conveying water from a gutter down spout to an entry opening in a rainwater collection device. With the invention, a rainwater collection and distribution apparatus is provided which has overflow apertures that permit excess water to overflow from the tank. With the invention, a rainwater collection and distribution apparatus provides a relatively large hydrostatic head in water near the bottom of the collection device to facilitate distribution of the water.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A rainwater collection and distribution apparatus for use with a house situated upon a ground surface, the house having an overhanging roof eave and a gutter extending along the eave, the gutter having a down spout extending therefrom, the apparatus comprising:

a tank assembly having a water containment portion removably positionable between the overhanging roof eave and a ground surface to receive water from the down spout;

a plurality of sharpened stakes projecting downwardly from the tank assembly which can be removably pierced into the ground surface to support the tank assembly between the overhanging roof eave and the ground surface;

a valve assembly connected to the tank assembly.

2. The apparatus of claim 1, and further comprising a house situated upon a ground surface, the house having an overhanging roof eave and a gutter extending along the eave, the gutter having a down spout extending therefrom;

wherein the tank assembly is removably positioned between the overhanging roof eave and the ground surface and positioned in fluid communication with the down spout;

wherein the plurality of sharpened stakes are removably pierced into the ground surface to support the tank assembly between the overhanging roof eave and the ground surface.

3. The apparatus of claim 2, wherein the house includes an exterior wall, with an outermost surface of the gutter being positioned an overhang distance from the exterior wall;

wherein the water containment portion of the tank assembly has a tank diameter substantially less than the overhang distance such that the entire tank assembly is positioned completely under the overhanging cover of the gutter and overhanging eave.

* * * * *